United States Patent
Otey et al.

(10) Patent No.: US 9,600,212 B2
(45) Date of Patent: Mar. 21, 2017

(54) RECEIPT VERIFICATION OF PRINT JOBS IN AN AUTOMATED DOCUMENT FACTORY ENVIRONMENT

(75) Inventors: Ned Otey, Louisville, CO (US); Adam A. Swartz, Thornton, CO (US)

(73) Assignee: Ricoh Company, Ltd., Tokyo (JP)

( * ) Notice: Subject to any disclaimer, the term of this patent is extended or adjusted under 35 U.S.C. 154(b) by 1888 days.

(21) Appl. No.: 12/915,343

(22) Filed: Oct. 29, 2010

(65) Prior Publication Data

US 2012/0105904 A1 May 3, 2012

(51) Int. Cl.
*G06F 3/12* (2006.01)

(52) U.S. Cl.
CPC .......... *G06F 3/1207* (2013.01); *G06F 3/1259* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 6,236,993 B1 * | 5/2001 | Fanberg | 707/690 |
| 6,762,851 B1 | 7/2004 | Lynch et al. | |
| 2007/0124421 A1 * | 5/2007 | Tashiro et al. | 709/217 |
| 2007/0127057 A1 | 6/2007 | Bridges et al. | |
| 2007/0273915 A1 | 11/2007 | Nakagawa | |
| 2007/0273922 A1 | 11/2007 | Matsugashita | |
| 2008/0291486 A1 | 11/2008 | Isles et al. | |

* cited by examiner

*Primary Examiner* — Huo Long Chen
(74) *Attorney, Agent, or Firm* — Duft Bornsen & Fettig LLP

(57) ABSTRACT

Methods and systems are provided for verifying the receipt of print jobs submitted to an Automated Document Factory (ADF) system from a client. The ADF system receives a print work summary from the client indicating print jobs scheduled for submission to the ADF system. The ADF system may then receive print jobs from the client. A determination is made regarding the differences between the print jobs received from the client and the print jobs scheduled for submission as indicated in the print work summary. A tracking report is generated indicating the differences, and a notification is provided to the client when the tracking report indicates that a difference exists between the print jobs received from the client and the print jobs indicated in the print work summary.

18 Claims, 4 Drawing Sheets

RECEIPT VERIFICATION OF PRINT JOBS IN AN AUTOMATED DOCUMENT FACTORY ENVIRONMENT

FIELD OF THE INVENTION

The invention relates to the field of printing systems and, in particular, to verifying the receipt of print jobs submitted to an automated document factory system.

BACKGROUND

Production printing systems generally comprise a number of high-speed printers used for volume printing, which may be capable of printing many thousands of pages per minute or more. Production printing systems are typically continuous-form printers that print on paper or some other printable medium that is stored on large rolls. An Automated Document Factory (ADF) system provides functionality that enhances the performance of production printing systems by providing a large scale production environment for printing. Because of this enhanced functionality, ADF systems are preferred for numerous high-volume printing applications including mass-mail printing of time sensitive statements and bills.

Typically, a host system (e.g., a printing application of a client) produces print jobs for submission to an ADF system. A print job submitted to an ADF system may include a plurality of documents. For example, a client may utilize an ADF system to print hundreds of thousands of bills included in a single print job. The documents of each print job are often intended for delivery by mail or private carrier. Therefore, the ADF system performs a number of services for the client that transcend the mere printing of print jobs submitted to the ADF system by the client, such as document post processing (e.g., stapling, inserting, folding, mailing, etc.).

In many cases, a client may be operating a number of print applications for submission to the ADF system on behalf of other parties. For example, the client may be operating a credit card billing application for a credit card company, a bank statement application for a bank, etc. Often, various reporting requirements exist for the third parties of the client to ensure that certain jobs are printed and delivered to customers in a timely manner. For example, credit card statements may be required to be printed and mailed to customers within a certain period of time during the card billing cycle. When a client is operating a number of print applications that fall under these and other types of reporting requirements, it becomes important to ensure that the print jobs generated by the client for the ADF system are accurately received by the ADF system.

SUMMARY

Embodiments described herein provide systems and methods for verifying the receipt of print jobs submitted to an Automated Document Factory (ADF) system from a client. The ADF system receives a print work summary from the client indicating print jobs scheduled for submission to the ADF system. The ADF system may then receive print jobs from the client. A determination is made regarding the differences between the print jobs received from the client and the print jobs scheduled for submission as indicated in the print work summary. A tracking report is generated indicating the differences, and a notification is provided to the client when the tracking report indicates that a difference exists between the print jobs received from the client and the print jobs indicated in the print work summary.

In one embodiment, an ADF system comprising a datacenter and a tracking system is disclosed. The datacenter is operable to receive a print work summary from the client indicating print jobs scheduled for submission to the ADF system, and to receive print jobs from the client. The tracking system is operable to determine differences between the print jobs received from the client and the print jobs scheduled for submission as indicated in the print work summary, to generate a tracking report indicating the differences, and to provide notification to the client when the tracking report indicates that a difference exists between the print jobs received from the client and the print jobs indicated in the print work summary.

In another embodiment, a method of verifying reception of print jobs at an ADF system is disclosed. In some embodiments, the method may be tangibly embodied onto a computer readable medium comprising instructions for performing the method by a processor. According to the method, a print work summary is received from a client indicating print jobs scheduled for submission to an ADF system. Differences are determined between the print jobs received from the client and the print jobs scheduled for submission as indicated in the print work summary. A tracking report is generated indicating the differences. A notification is provided to the client when the tracking report indicates that a difference exists between the print jobs received from the client and the print jobs indicated in the print work summary.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
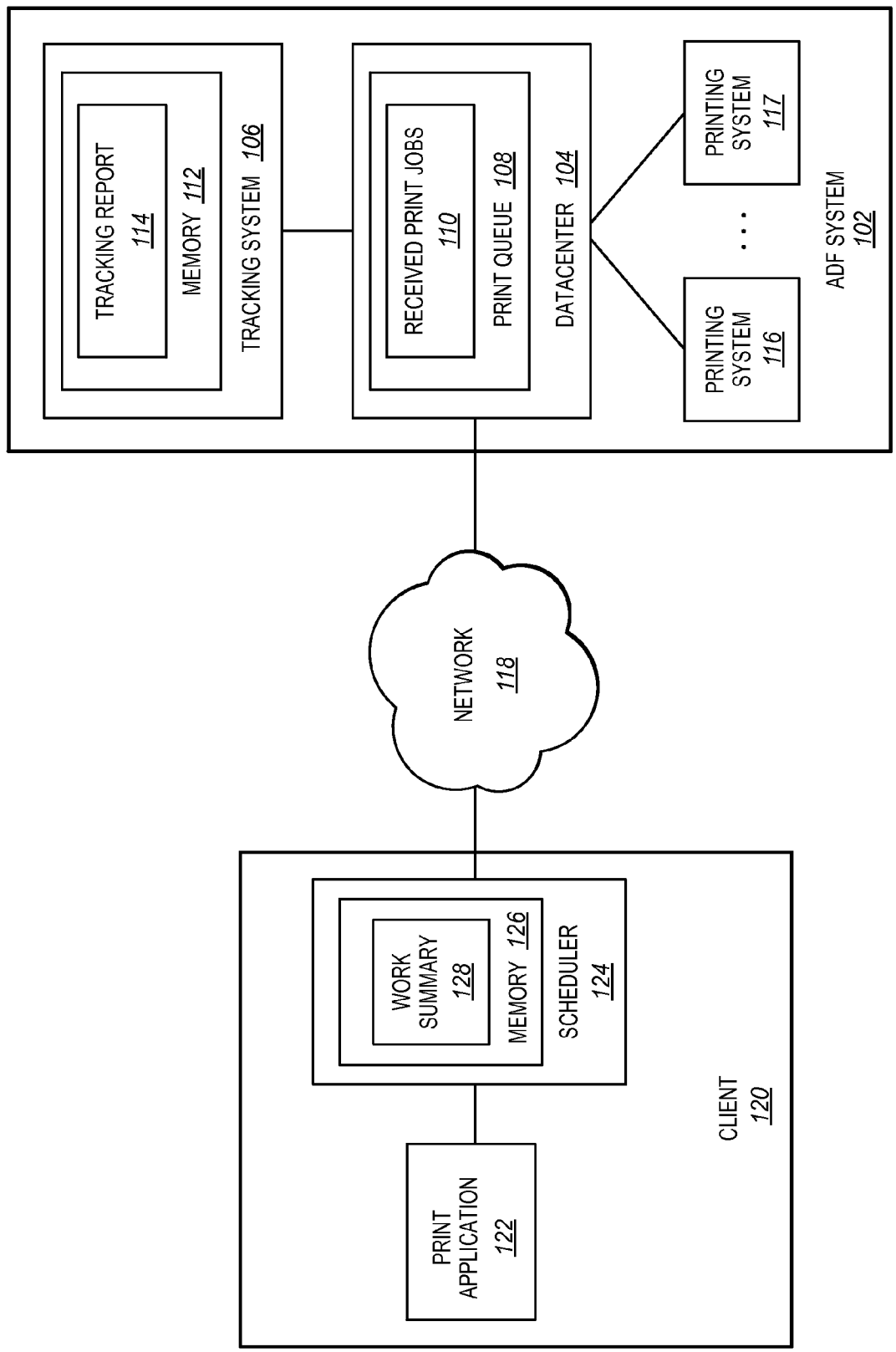
FIG. 1 is a block diagram illustrating an ADF environment in an exemplary embodiment.

FIG. 1 is a block diagram illustrating an ADF environment in an exemplary embodiment. Generally, an ADF system 102 receives print jobs from a client 120 over a network 118. ADF system 102 also receives a work summary 128 indicating print jobs scheduled for submission to ADF system 102. ADF system 102 then determines the differences between work summary 128 and print jobs received from client 120. When differences exist, ADF system 102 provides a notification to client 120. This allows for a verification of print jobs received from client 120 at ADF system 102. After ADF system 102 receives print jobs from client 120, ADF system 102 may print the print jobs or publish the print jobs to remote systems for viewing on the internet.

ADF system 102 includes a datacenter 104. In ADF system 102, datacenter 104 comprises any system, component, or device operable to receive print work summary 128 from client 120, and to receive print jobs from client 120. Datacenter 104 also includes a print queue 108 for storing one or more received print jobs 110. ADF system 102 also includes a tracking system 106. Tracking system 106 comprises any system, component, or device operable to determine differences between received print jobs 110 and print jobs scheduled for submission as indicated in work summary 128, and to notify client 120 when differences exist. Tracking system 106 generates a tracking report 114 stored in a memory 112 for indicating the differences. ADF system 102 also includes one or more printing systems 116-117 for printing received print jobs 110.

Client 120 includes one or more print applications 122 for generating print data. Print application 122 creates one or more print jobs and transmits the print jobs to ADF system 102. Print application 122 also coordinates with a scheduler 124 of client 120 to generate work summary 128 (stored in a memory 126) indicating the print jobs scheduled for submission to ADF system 102. How ADF system 102 performs receipt verification of print jobs received from client 120 will be discussed with respect to FIG. 2.

Figure 2:
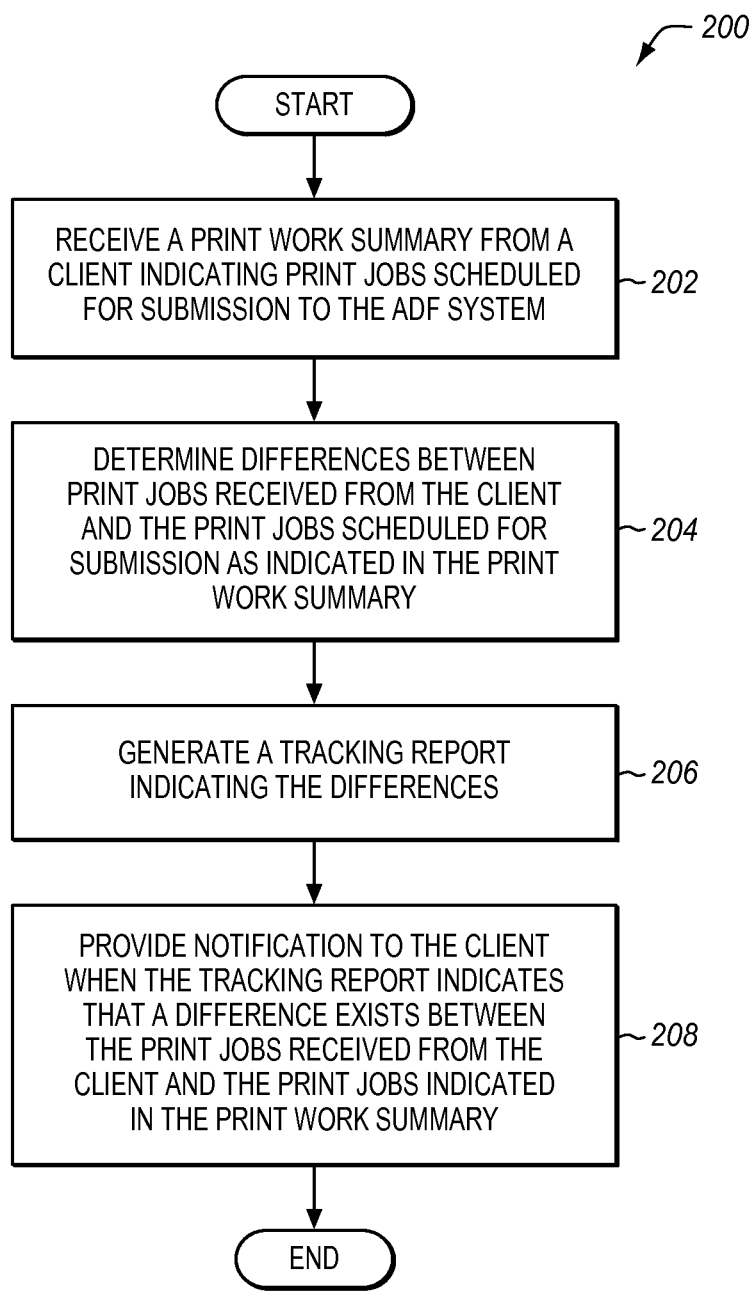
FIG. 2 is a flow chart illustrating a method of verifying the reception of print jobs scheduled for submission to an ADF system in an exemplary embodiment.

FIG. 2 is a flow chart illustrating a method 200 of verifying the reception of print jobs at ADF system 102 in an exemplary embodiment. The steps of method 200 will be described with respect to the system of FIG. 1, although one skilled in the art will recognize that method 200 may be performed by other systems not shown. The steps of the flow charts described herein are not all inclusive and may include other steps not shown. Further, the steps may be performed in an alternative order.

In step 202, datacenter 104 receives a print work summary 128 from client 120 indicating print jobs scheduled for submission to ADF system 102. In step 204, tracking system 106 determines the differences between received print jobs 110 from client 102 and the print jobs scheduled for submission as indicated in print work summary 128. Print work summary 128 may indicate that zero print jobs are scheduled for submission, or one or more print jobs are scheduled for submission. Further, print work summary 128 may indicate that a print job is scheduled, but the print job is empty (i.e., the print job does not include documents). Therefore, received print jobs 110 from client 120 may include none, or one or more print jobs, and also may include empty print jobs. In determining the differences, tracking system 106 may process work summary 128 received from client 120, and compare the number of print jobs scheduled for submission with the number of received print jobs 110. Tracking system may also compare a number of documents indicated in print work summary 128 with a number of documents in one or more of received print jobs 110. In like manner, tracking system may also compare a number of bytes and/or a Cyclic Redundancy Check (CRC) value indicated for a print job in print work summary 128 with values calculated for received print jobs 110. Differences may indicate that one or more received print jobs 110 are corrupted.

In step 206, tracking system 106 generates tracking report 114 indicating the differences as determined in step 204. In step 208, tracking system 106 provides a notification to client 120 when tracking report 114 indicates that a difference exists between received print jobs 110 from client 120 and the print jobs indicated in print work summary 128. In an optional embodiment, print work summary 128 may indicate print jobs scheduled for submission to ADF system 102 during a print cycle. A print cycle may include a billing cycle for print application 122, a length of time such as a work day, or some other defined time period. When work summary 128 indicates print jobs scheduled for submission during a print cycle, then step 208 may also include providing a notification to client 120 that the print cycle did not complete successfully. In other words, print work summary 128 in the optional embodiment allows for the verification of print jobs scheduled during a print cycle, such as verifying that ADF system 102 receives print jobs from client 120 that are scheduled for submission during a 24 hour period.

EXAMPLES

Figure 3:
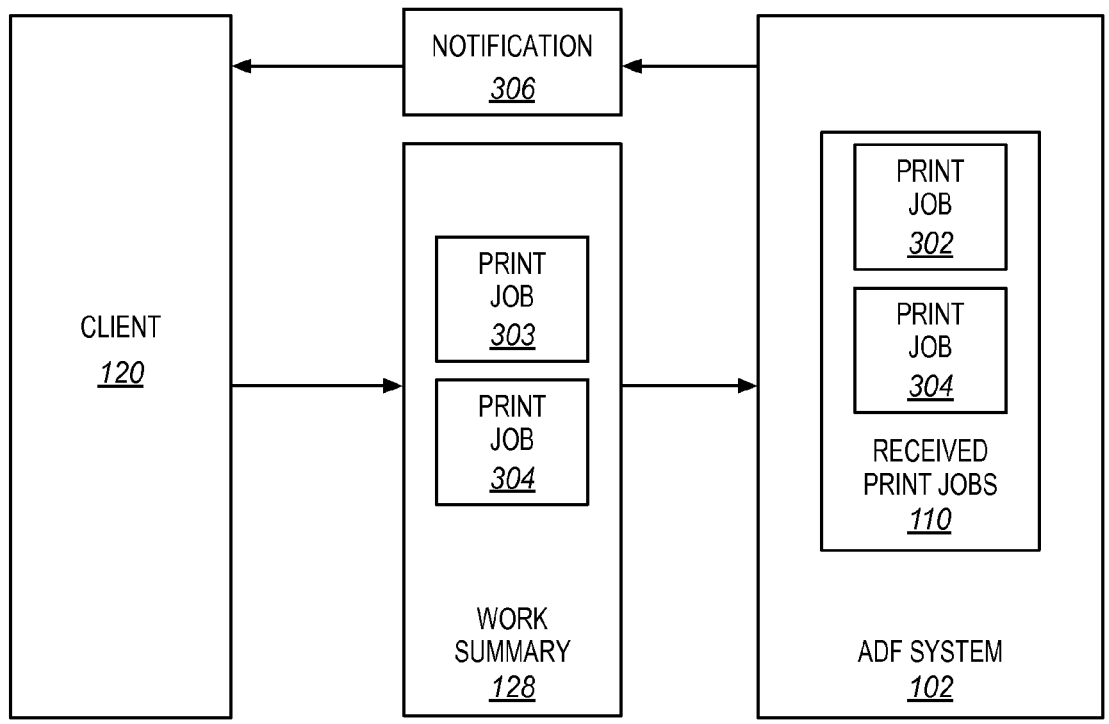
FIGS. 3-4 are examples of verifying the reception of print jobs scheduled for submission to an ADF system in an exemplary embodiment.
Figure 4:
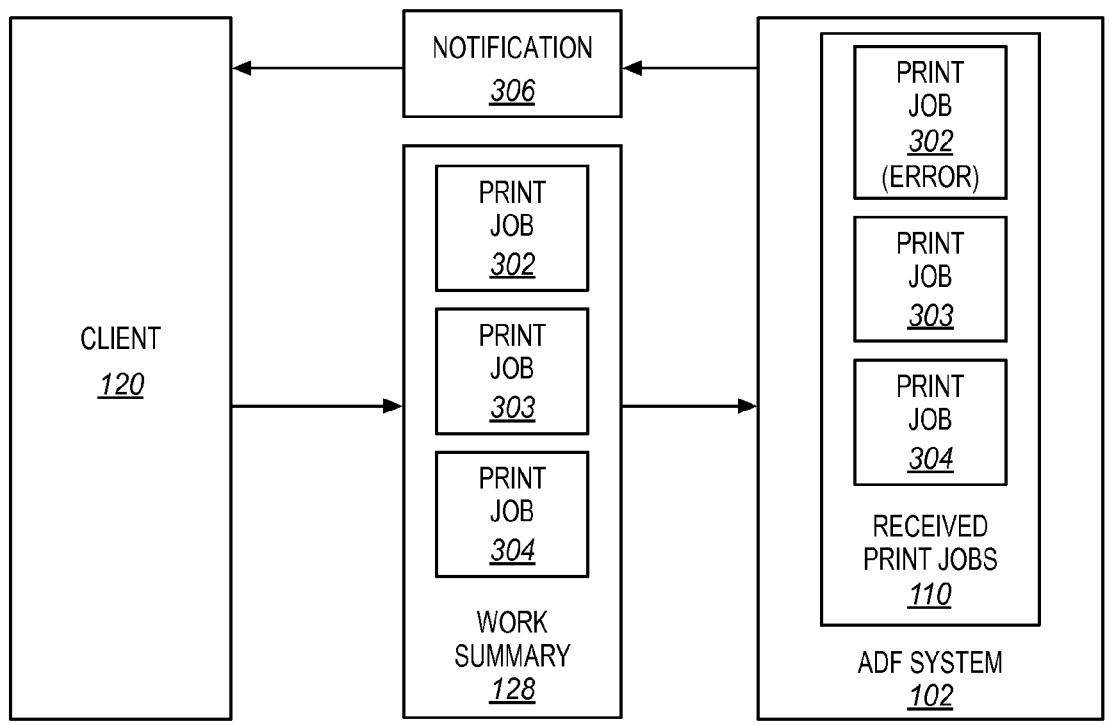

FIGS. 3-4 are examples of verifying the reception of print jobs scheduled for submission to an ADF system in an exemplary embodiment. In FIG. 3, print work summary 128 includes an indication that three print jobs are scheduled for submission (print jobs 302-304). However, ADF system 102 only receives two print jobs (print job 302 and print job 304). Thus, while print job 303 was scheduled for submission to ADF system 102, print job 303 was never received by ADF system 102. ADF system 102 then determines the difference between print jobs scheduled for submission as indicated in work summary 128, and received print jobs 110. As a difference exists, ADF system 102 provides a notification 306 to client 120 indicating the differences. For example, notification 306 may list print jobs 303 as "missing". In response to notification 306, client 120 may re-try sending print job 303 to ADF system 102.

In FIG. 4, print work summary 128 includes an indication that three print jobs are scheduled for submission (print jobs 302-304). While ADF system 102 receives the three print jobs 302-305, print job 302 has an error. In this case, a CRC value indicated in print work summary 128 for print job 302 does not match a CRC value calculated for print job 302 as received by ADF system 102. This may be due to an error during transmission of print job 302 to ADF system 102. As a difference exists, ADF system 102 provides a notification 306 to client 120 indicating the differences. For example, notification 306 may list print job 302 as "corrupted". In response to notification 306, client 120 may re-try sending print job 302 to ADF system 102.

Figure 5:
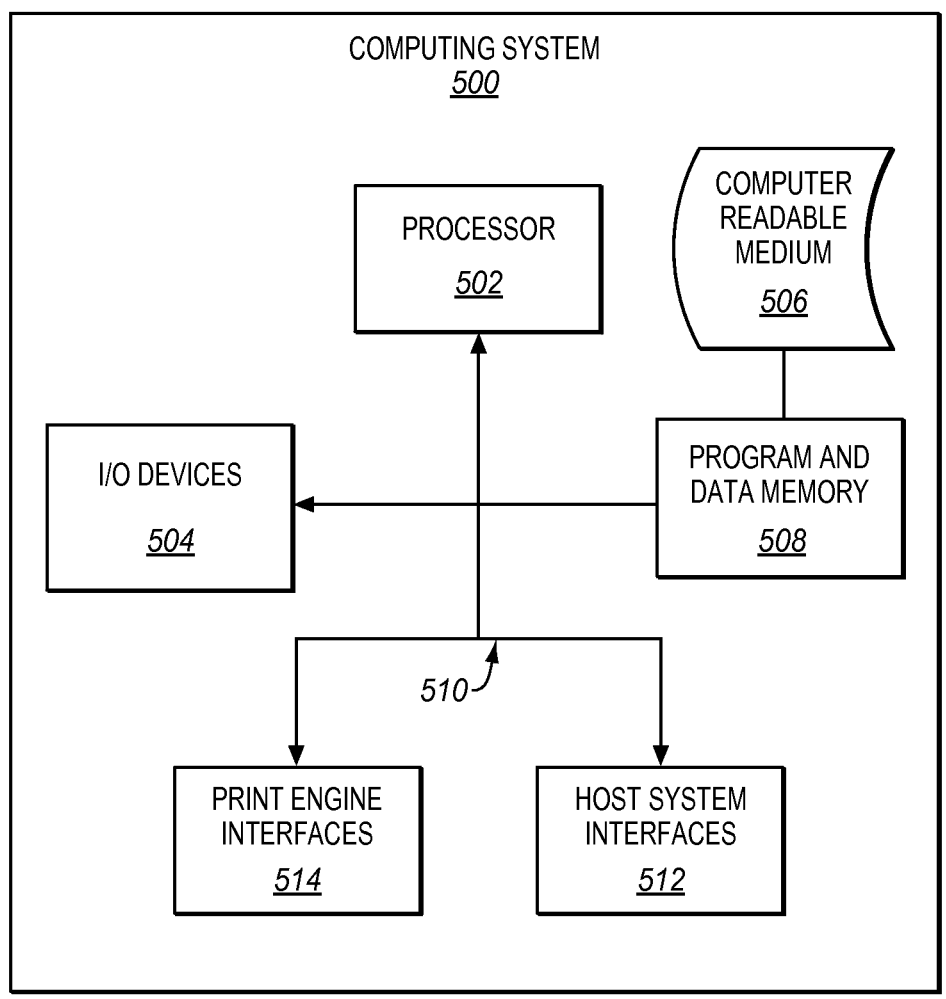
FIG. 5 illustrates a computer system operable to execute computer readable medium embodying programmed instructions to perform desired functions in an exemplary embodiment.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 5 illustrates a computing system 500 in which a computer readable medium 506 may provide instructions for performing methods 200, 300, and 400 in an exemplary embodiment.

Furthermore, the invention can take the form of a computer program product accessible from a computer-usable or computer-readable medium 506 providing program code for use by or in connection with a computer or any instruction execution system. For the purposes of this description, a computer-usable or computer readable medium 506 can be any apparatus that can contain, store, communicate, propagate, or transport the program for use by or in connection with the instruction execution system, apparatus, or device.

The medium 506 can be an electronic, magnetic, optical, electromagnetic, infrared, or semiconductor system (or apparatus or device) or a propagation medium. Examples of a computer-readable medium 506 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code includes at least one processor 502 coupled directly or indirectly to memory 508 through a system bus 510. The memory 508 can include local memory employed during actual execution of the program code, bulk storage, and cache memories which provide temporary storage of at least some program code in order to reduce the number of times code is retrieved from bulk storage during execution.

Input/output or I/O devices 504 (including but not limited to keyboards, displays, pointing devices, etc.) can be coupled to the system either directly or through intervening I/O controllers.

Network adapters may also be coupled to the system to enable the data processing system to become coupled to other data processing systems, such a through host systems interfaces 512, or remote printers or storage devices through intervening private or public networks, such as through print engine interfaces 514. Modems, cable modem and Ethernet cards are just a few of the currently available types of network adapters.

Although specific embodiments were described herein, the scope of the invention is not limited to those specific embodiments. The scope of the invention is defined by the following claims and any equivalents thereof.

We claim:

1. An Automated Document Factory (ADF) system comprising:
   a datacenter operable to receive a print work summary from a client indicating print jobs scheduled for submission to the ADF system, and to receive print jobs from the client; and
   a tracking system including a memory, the tracking system operable to determine differences between the print jobs received from the client and the print jobs scheduled for submission as indicated in the print work summary, to generate in the memory a tracking report indicating the differences, and to provide notification to the client when the tracking report indicates that a difference exists between the print jobs received from the client and the print jobs indicated in the print work summary.

2. The ADF system of claim 1 wherein:
   the print work summary indicates print jobs scheduled for submission during a print cycle, and
   the tracking system is further operable to provide notification to the client indicating that the print cycle did not complete successfully when there are differences between the print jobs received from the client during the print cycle and the print jobs scheduled for submission during the print cycle as indicated in the print work summary.

3. The ADF system of claim 1 wherein:
   the tracking system is further operable to compare a number of print jobs received from the client and a number of print jobs as indicated in the print work summary to determine the differences.

4. The ADF system of claim 1 wherein:
   the tracking system is further operable to compare a number of documents in a print job received from the client and a number of documents for the print job as indicated in the print work summary to determine the differences.

5. The ADF system of claim 1 wherein:
   the tracking system is further operable to compare a number of bytes in a print job received from the client and a number of bytes for the print job as indicated in the print work summary to determine the differences.

6. The ADF system of claim 1 wherein:
   the tracking system is further operable to compare a Cyclic Redundancy Check (CRC) value calculated for a print job received from the client and a CRC value for the print job as indicated in the print work summary to determine the differences.

7. A method comprising:
   receiving, by a datacenter, a print work summary from a client indicating print jobs scheduled for submission to an ADF system;
   determining, by a tracking system, differences between print jobs received from the client and the print jobs scheduled for submission as indicated in the print work summary;
   generating, by a tracking system, a tracking report indicating the differences; and
   providing, by a tracking notification to the client when the tracking report indicates that a difference exists between the print jobs received from the client and the print jobs indicated in the print work summary.

8. The method of claim 7 wherein:
   the print work summary indicates print jobs scheduled for submission during a print cycle, and
   providing notification further comprises:
      providing notification to the client indicating that the print cycle did not complete successfully when there are differences between the print jobs received from the client during the print cycle and the print jobs scheduled for submission during the print cycle as indicated in the print work summary.

9. The method of claim 7 wherein:
   determining the differences further comprises:
      comparing a number of print jobs received from the client and a number of print jobs as indicated in the print work summary to determine the differences.

10. The method of claim 7 wherein determining the differences further comprises:
    comparing a number of documents in a print job received from the client and a number of documents for the print job as indicated in the print work summary to determine the differences.

11. The method of claim 7 wherein determining the differences further comprises:
    comparing a number of bytes in a print job received from the client and a number of bytes for the print job as indicated in the print work summary to determine the differences.

12. The method of claim 7 wherein determining the differences further comprises:
comparing a Cyclic Redundancy Check (CRC) value calculated for a print job received from the client and a CRC value for the print job as indicated in the print work summary to determine the differences.

13. A non-transitory computer readable medium tangibly embodying programmed instructions which, when executed by a processor, are operable for performing a method of verifying reception of print jobs at an Automated Document Factory (ADF) system, the method comprising:
receiving a print work summary from a client indicating print jobs scheduled for submission to an ADF system;
determining differences between print jobs received from the client and the print jobs scheduled for submission as indicated in the print work summary;
generating a tracking report indicating the differences; and
providing notification to the client when the tracking report indicates that a difference exists between the print jobs received from the client and the print jobs indicated in the print work summary.

14. The non-transitory computer readable medium of claim 13 wherein:
the print work summary indicates print jobs scheduled for submission during a print cycle, and
providing notification further comprises:
providing notification to the client indicating that the print cycle did not complete successfully when there are differences between the print jobs received from the client during the print cycle and the print jobs scheduled for submission during the print cycle as indicated in the print work summary.

15. The non-transitory computer readable medium of claim 13 wherein determining the differences further comprises:
comparing a number of print jobs received from the client and a number of print jobs as indicated in the print work summary to determine the differences.

16. The non-transitory computer readable medium of claim 13 wherein determining the differences further comprises:
comparing a number of documents in a print job received from the client and a number of documents for the print job as indicated in the print work summary to determine the differences.

17. The non-transitory computer readable medium of claim 13 wherein determining the differences further comprises:
comparing a number of bytes in a print job received from the client and a number of bytes for the print job as indicated in the print work summary to determine the differences.

18. The non-transitory computer readable medium of claim 13 wherein determining the differences further comprises:
comparing a Cyclic Redundancy Check (CRC) value calculated for a print job received from the client and a CRC value for the print job as indicated in the print work summary to determine the differences.

* * * * *